United States Patent
Harada (10) Patent No.: US 8,469,857 B2
(45) Date of Patent: Jun. 25, 2013

(54) VEHICLE AND CONTROL METHOD AND CONTROL DEVICE FOR VEHICLE

(75) Inventor: Hironori Harada, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 147 days.

(21) Appl. No.: 13/061,610

(22) PCT Filed: May 13, 2009

(86) PCT No.: PCT/JP2009/058899
§ 371 (c)(1),
(2), (4) Date: Mar. 1, 2011

(87) PCT Pub. No.: WO2010/026801
PCT Pub. Date: Mar. 11, 2010

(65) Prior Publication Data
US 2011/0160019 A1    Jun. 30, 2011

(30) Foreign Application Priority Data
Sep. 3, 2008    (JP) .................... 2008-226009

(51) Int. Cl.
*B60K 1/02* (2006.01)
(52) U.S. Cl.
USPC .............................. 477/3; 903/907
(58) Field of Classification Search
USPC ..................... 477/3; 903/907, 930
See application file for complete search history.

(56) References Cited

U.S. PATENT DOCUMENTS

| | | | |
|---|---|---|---|
| 6,701,880 B1 * | 3/2004 | Gauthier et al. | 123/179.3 |
| 2007/0202987 A1 * | 8/2007 | Kakinami et al. | 477/3 |
| 2009/0118078 A1 * | 5/2009 | Wilmanowicz et al. | 477/3 |
| 2009/0277701 A1 | 11/2009 | Soma et al. | |
| 2010/0001866 A1 | 1/2010 | Ichikawa et al. | |

FOREIGN PATENT DOCUMENTS

| | | |
|---|---|---|
| EP | 1 920 986 A1 | 5/2008 |
| EP | 2 068 417 A1 | 6/2009 |
| JP | A-2007-62638 | 3/2007 |
| JP | A-2008-109755 | 5/2008 |
| JP | A-2008-109840 | 5/2008 |
| JP | A-2008-167620 | 7/2008 |

OTHER PUBLICATIONS

International Search Report dated Aug. 18, 2009 in corresponding International Application No. PCT/JP2009/058899 (with translation).

* cited by examiner

*Primary Examiner* — Edwin A Young
(74) *Attorney, Agent, or Firm* — Oliff & Berridge, PLC (57) ABSTRACT

An ECU controls SOCs of a master battery and a sub battery so that the SOCs vary within the range of a predetermined upper limit value and lower limit value. A control is made so that the SOC of the sub battery is lower than the SOC of the master battery when the condition that execution of charging with electric power supplied from the source external to a plug-in hybrid vehicle is predicted is satisfied.

9 Claims, 8 Drawing Sheets

VEHICLE AND CONTROL METHOD AND CONTROL DEVICE FOR VEHICLE

TECHNICAL FIELD

The present invention relates to a vehicle and a control method and a control device for a vehicle, and in particular to a technique of controlling state of charge of a first battery and a second battery that are connected in parallel so as to store electric power supplied from a source external to the vehicle, and supply the stored electric power to a rotating electric machine serving as a driving source.

BACKGROUND ART

Conventionally, vehicles equipped with a rotating electric machine as a driving source, such as hybrid vehicles, electric automobiles, and fuel cell electric vehicles are known. Such a vehicle is equipped with a battery or the like for storing electric power to be supplied to an electric motor. The battery stores electric power generated at the time of regenerative braking or electric power generated by a generator equipped on the vehicle.

Incidentally, also known is a vehicle that is charged by supplying electric power to a battery equipped on the vehicle from a electric power source external to the vehicle such as a electric power source in a house. By connecting a socket provided in a house and an inlet provided in the vehicle with a cable, electric power is supplied to the battery of the vehicle from the electric power source in the house. Hereinafter, a vehicle that charges a battery equipped on the vehicle by a electric power source disposed external to the vehicle is also referred to as a plug-in vehicle.

In a plug-in vehicle, for further reducing the cost required for charging of the battery, it is supposed to charge the battery in the middle of night when the electric power rate is generally set low. However, in the hybrid vehicle, the battery is managed so that a certain state of charge (SOC) that allows traveling by the rotating electric machine is constantly ensured. Therefore, the charging amount of the battery in the middle of night is limited.

For addressing this, there is proposed a technique of varying a target range or a target value of the state of charge of the battery so as to charge the battery with much more electric power in the middle of night.

Japanese Patent Laying-Open No. 2007-62638 (Patent Document 1) discloses a hybrid car including a chargeable/dischargeable electric power storage device for supplying electric power to a rotating electric machine, a electric power input unit for receiving the electric power supplied from a source external to the vehicle to charge the electric power storage device, a generator for generating electric power using output from an internal combustion engine and supplying the generated electric power to the electric power storage device, a controller for controlling a charging state of the electric power storage device to a predetermined control range or control target value, and an input device for switching the predetermined control range or control target value.

In the hybrid car described in this publication, the electric power storage device can be charged by receiving the electric power externally given to the electric power input unit of the vehicle. Also, when the SOC of the electric power storage device decreases during traveling, the electric power storage device can be charged by driving the internal combustion engine and the generator. On the other hand, the SOC of the electric power storage device is controlled to a predetermined control range or control target value. Specifically, when the SOC of the electric power storage device decreases, the controller drives the internal combustion engine and the generator to change the electric power storage device. Here, in this hybrid car, since the predetermined control range or control target value can be switched by the input device, when the vehicle is to arrive at a location where charging is possible (for example, home where charging equipment is installed) in a time zone where electric power rate is low (for example, midnight electric power time zone), the predetermined control range or control target value can be set lower than usual by the input device. As a result, the electric power charged in the electric power storage device is actively used during the traveling until the vehicle arrives at the chargeable location, and a charging amount from the external electric power source at the chargeable location can be increased, with the result that more low-price electric power can be applied for charging.

PRIOR ART DOCUMENTS

Patent Documents

Patent Document 1: Japanese Patent Laying-Open No. 2007-62638

SUMMARY OF THE INVENTION

Problems to be Solved by the Invention

However, in the hybrid car as described in Japanese Patent Laying-Open No. 2007-62638, if charging of the battery is not executed for some reason (for example, interruption of electric service) after the target range or target value of the state of charge of the battery is set lower than usual, the travel should be made while the state of charge of the battery remains low. In this case, the motive power performance of the plug-in vehicle may decrease.

It is an object of the present invention to ensure the motive power performance even when charging is not executed.

Means for Solving the Problems

A vehicle according to an aspect includes an internal combustion engine as a driving source, a rotating electric machine as a driving source, a generator for generating electric power by a driving force of the internal combustion engine, a first battery for storing electric power supplied from a source external to a vehicle and electric power generated by the generator and supplying the stored electric power to the rotating electric machine, a second battery connected in parallel with the first battery, for storing electric power supplied from the source external to the vehicle and electric power generated by the generator and supplying the stored electric power to the rotating electric machine, and a control unit. The control unit controls a state of charge of each of the batteries according to at least either one of a target range and a target value of the state of charge of each of the batteries, sets at least either one of the target range and the target value of the state of charge of each of the batteries so that the state of charge of the second battery is lower than the state of charge of the first battery, and controls the internal combustion engine and the rotating electric machine so that the vehicle travels by a driving force of at least either one of the internal combustion engine and the rotating electric machine after the state of charge of the second battery becomes lower than the state of charge of the first battery.

With this configuration, the state of charge of the first battery is controlled depending on at least either one of the target range or target value of the state of charge of the first battery. Similarly, the state of charge of the second battery is controlled depending on at least either one of the target range or target value of the state of charge of the second battery. The target range or target value of the state of charge of each battery is set so that the state of charge of the second battery is lower than the state of charge of the first battery. After the state of charge of the second battery becomes lower than the state of charge of the first battery, the internal combustion engine and the rotating electric machine are controlled so that the vehicle travels by a driving force of at least either one of the internal combustion engine and the rotating electric machine. As a result, it is possible to keep the state of charge of the first battery high, while keeping the state of charge of the second battery low. Therefore, it is possible to leave a room for being charged with electric power supplied from the source external to the vehicle in the second battery, while storing the electric power required for letting the vehicle travel by using the rotating electric machine, in the first battery. Therefore, it is possible to charge the second battery with the electric power when electric power is supplied from an external electric power source, while driving the rotating electric machine by using the electric power stored in the first battery when charging of the second battery is not executed for some reason. As a result, it is possible to ensure the motive power performance even when charging is not executed.

Preferably, the control unit sets at least either one of the target range and the target value of the state of charge of each battery in such a manner that the state of charge of the second battery becomes lower than the state of charge of the first battery by causing, when a predetermined condition is satisfied, the state of charge of the first battery to be equal to or more than the state of charge of the first battery of the case where the condition is not satisfied and the state of charge of the second battery to be lower than the state of charge of the second battery of the case where the condition is not satisfied.

With this configuration, when the predetermined condition is satisfied, the state of charge of the second battery is controlled to be lower than the state of charge of the second battery of the case where the condition is not satisfied. As a result, the second battery can be charged with the electric power supplied from the external electric power source after decreasing the state of charge of the second battery. Therefore, it is possible to increase the charging amount of the second battery by the electric power supplied from the external electric power source. On the other hand, the state of charge of the first battery is controlled to be equal to or more than the state of charge of the first battery of the case where the condition is not satisfied. As a result, it is possible to store the electric power required for letting the vehicle travel by using the rotating electric machine in the first battery. Therefore, even when charging of the second battery whose state of charge is decreased is not executed for some reason, the rotating electric machine can be driven by using the electric power stored in the first battery. Therefore, it is possible to ensure the motive power performance even when charging is not executed.

More preferably, the condition is a condition that execution of charging with electric power supplied from the source external to the vehicle is predicted.

With this configuration, when execution of charging with the electric power supplied from the source external to the vehicle is predicted, the state of charge of the second battery can be decreased in advance. As a result, it is possible to increase the charging amount of the second battery with the electric power supplied from the source external to the vehicle.

More preferably, the condition that execution of charging with electric power supplied from the source external to the vehicle is predicted is a condition that time at which the vehicle is predicted to arrive at a location where it is defined that charging with electric power supplied from the source external to the vehicle is possible is included in a time zone where electric power rate is set to be lower than that in other time zones.

With this configuration, when the time at which the vehicle is predicted to arrive at the location where it is defined that charging with the electric power supplied from the source external to the vehicle is possible is included in the time zone where the electric power rate, is set lower than that in other time zones, the state of charge of the second battery may be decreased in advance. As a result, it is possible to charge the second battery with a larger amount of electric power with a lower cost.

More preferably, the control unit controls the state of charge of the second battery to decrease to a lower limit value.

With this configuration, the state of charge of the second battery is decreased to the lower limit value. As a result, it is possible to maximize the charging amount of the second battery by the electric power supplied from the external electric power source.

More preferably, a capacity of the first battery and a capacity of the second battery are equivalent.

According to this, it is possible to ensure the motive power performance even when charging is not executed in the vehicle where two batteries of the same capacity are connected in parallel.

Effects of the Invention

According to the present invention, it is possible to ensure the motive power performance even when charging is not executed.

MODES FOR CARRYING OUT THE INVENTION

Hereinafter, embodiments of the present invention will be described with reference to the drawings. In the following description, identical parts are denoted by identical reference numerals. The name and the function thereof are also identical. Therefore, detailed description thereof will not be repeated.

Figure 1:
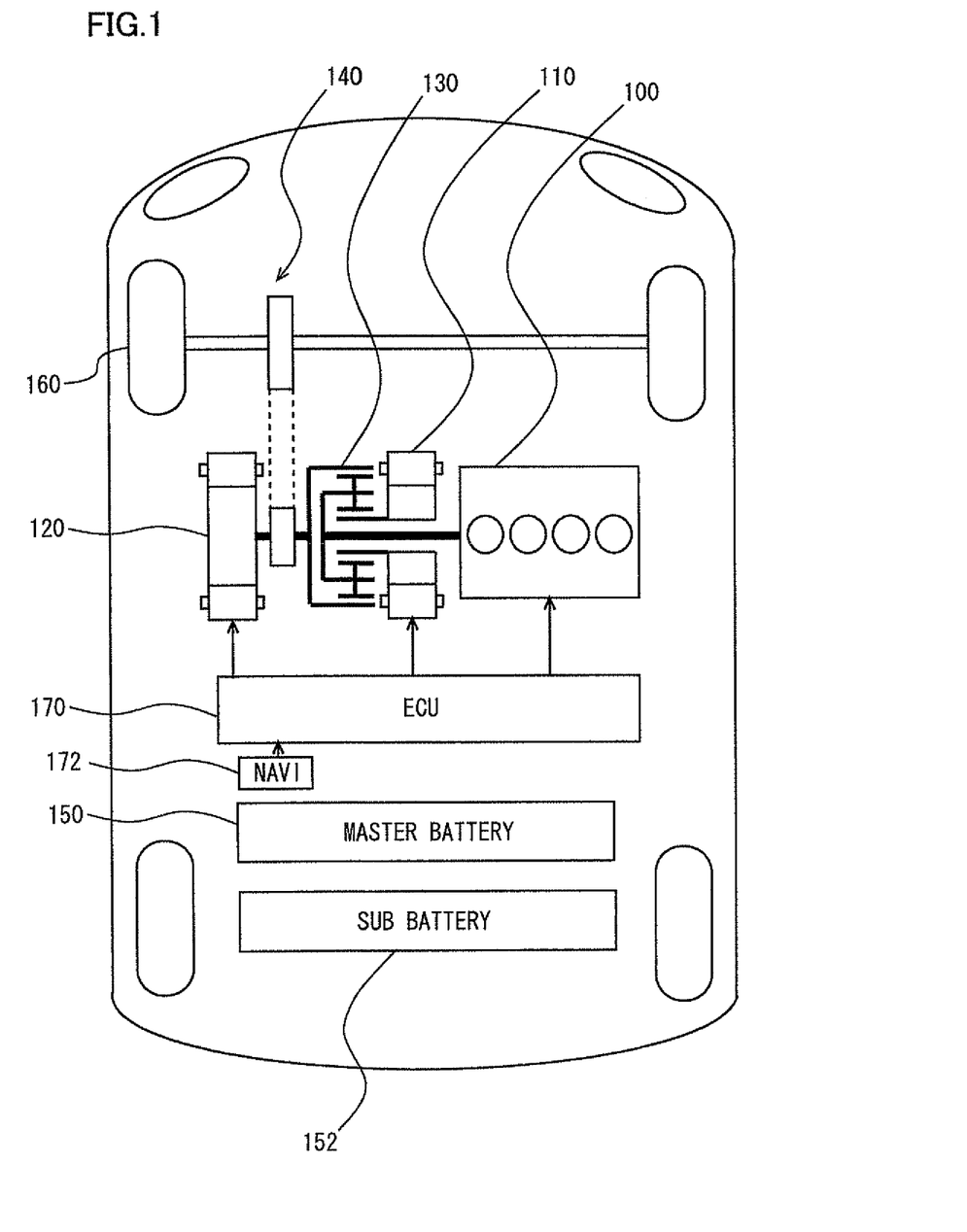
FIG. 1 is a schematic structural view showing a plug-in hybrid vehicle.

Referring to FIG. 1, a plug-in hybrid vehicle equipped with a control device according to an embodiment of the present invention will be described. The vehicle is equipped with an engine 100, a first MG (Motor Generator) 110, a second MG 120, a power split device 130, a reduction gear 140, a master battery 150, and a sub battery 152.

Engine 100, first MG 110, second MG 120, master battery 150, and sub battery 152 are controlled by an ECU (Electronic Control Unit) 170. ECU 170 may be split into a plurality of ECUs.

This vehicle travels by a driving force from at least either one of engine 100 and second MG 120. More specifically, the plug-in hybrid vehicle travels while switching a HV travel mode and an EV travel mode automatically or manually.

In the HV travel mode, the vehicle travels while automatically switching at least either one or both of engine 100 and second MG 120 as a driving source depending on the operating state. In the EV travel mode, the vehicle travels using only second MG 120 as a driving source. Also in the EV travel mode, engine 100 may operate for electric power generation and the like.

Engine 100, first MG 110, and second MG 120 are connected via power split device 130. The power generated by engine 100 is split into two routes by power split device 130. One route drives front wheels 160 via reduction gear 140. The other route drives first MG 110 to generate electric power.

First MG 110 is a three-phase AC rotating electric machine having a U-phase coil, a V-phase coil, and a W-phase coil. First MG 110 generates electric power by the power of engine 100 split by power split device 130. The electric power generated by first MG 110 is appropriately used depending on the travel state of the vehicle, and states of SOCs of master battery 150 and sub battery 152. For example, during normal traveling, the electric power generated by first MG 110 directly drives second MG 120. On the other hand, when the SOC of master battery 150 or sub battery 152 is lower than a predetermined value, the electric power generated by first MG 110 is converted from alternating current to direct current by an inverter as will be described later. Then it is stored in master battery 150 or sub battery 152 after adjustment of voltage by a converter as will be described later.

When first MG 110 operates as a generator, first MG 110 generates a negative torque. Here, the negative torque refers to such a torque that will be a load on engine 100. When first MG 110 operates as a motor while it is supplied with electric power, first MG 110 generates a positive torque. Here, the positive torque refers to such a torque that will not be a load on engine 100, namely, a torque that assists rotation of engine 100. The same also applies to second MG 120.

Second MG 120 is a three-phase AC rotating electric machine having a U-phase coil, a V-phase coil, and a W-phase coil. Second MG 120 is driven by the electric power of at least either of electric power stored in master battery 150 and sub battery 152 and the electric power generated by first MG 110.

The driving force of second MG 120 is transmitted to front wheels 160 via reduction gear 140. As a result, second MG 120 assists engine 100 and makes the vehicle travel by the driving force from second MG 120. In place of front wheels 160, rear wheels may be driven.

At the time of regenerative braking of the plug-in hybrid vehicle, second MG 120 is driven by front wheels 160 via reduction gear 140, and second MG 120 operates as a generator. As a result, second MG 120 operates as a regenerative brake that converts the breaking energy to the electric power. The electric power generated by second MG 120 is stored in master battery 150 or sub battery 152.

Power split device 130 is implemented by a planetary gear including a sun gear, a pinion gear, a carrier, and a ring gear. The pinion gear meshes with the sun gear and the ring gear. The carrier supports the pinion gear to be able to rotate. The sun gear is connected to a rotation axis of first MG 110. The carrier is connected to a crank shaft of engine 100. The ring gear is connected to a rotation axis of second MG 120 and reduction gear 140.

As a result of connection of engine 100, first MG 110, and second MG 120 via power split device 130 implemented by a planetary gear, rotation speeds of engine 100, first MG 110, and second MG 120 have the relation connected by a straight line in a nomographic chart.

Returning to FIG. 1, master battery 150 and sub battery 152 are realized by an assembled battery formed by serially connecting a plurality of battery modules each including integrated plural battery cells. Voltages of master battery 150 and sub battery 152 are, for example, about 200V. Master battery 150 and sub battery 152 are charged with electric power supplied from a electric power source external to the vehicle, as well as from first MG 110 and second MG 120.

Capacities of master battery 150 and sub battery 152 (maximum charge amount that can be charged) are identical or substantially identical.

The plug-in hybrid vehicle in the present embodiment is further equipped with a navigation device 172. Navigation device 172 has a function of predicting the arrival time to the destination inputted by an operator base on, for example, the current position of the plug-in hybrid vehicle, the vehicle speed, and map data including a distance.

Figure 2:
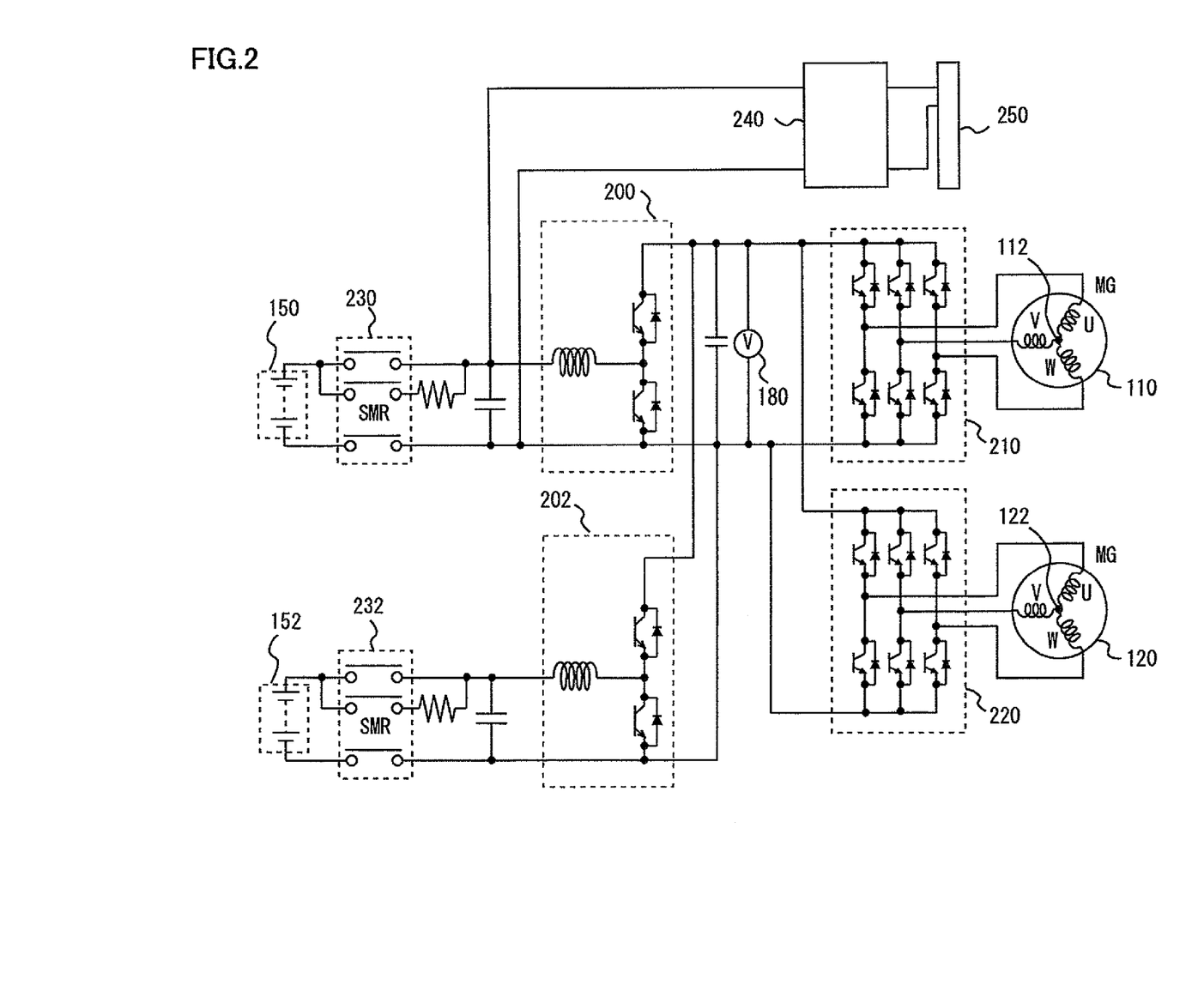
FIG. 2 is a view showing an electric system of a plug-in hybrid vehicle (Part 1).

Referring to FIG. 2, an electric system of the plug-in hybrid vehicle will be further described. The plug-in hybrid vehicle is provided with a master converter 200, a sub converter 202, a first inverter 210, a second inverter 220, a master SMR (System Main Relay) 230, a sub SMR 232, a charger 240, and an inlet 250.

Master converter 200 and sub converter 202 include a reactor, two npn transistors, and two diodes. The reactor is connected at its one end with a positive electrode side of each battery and connected at its other end with a connection point between the two npn transistors.

The two npn transistors are connected in series. The npn transistor is controlled by ECU 170. Between a collector and an emitter of each npn transistor, a diode is connected so that the current flows from the emitter side to the collector side.

As the npn transistor, for example, IGBT (Insulated Gate Bipolar Transistor) may be used. In place of the npn transistor, a power switching device such as power MOSFET (Metal Oxide Semiconductor Field-Effect Transistor) may be used.

When the electric power discharged from master battery 150 is supplied to first MG 110 or second MG 120, the voltage is boosted by master converter 200. Contrarily, when master battery 150 is charged with the electric power generated by first MG 110 or second MG 120, the voltage is decreased by master converter 200.

Similarly, when the electric power discharged from sub battery 152 is supplied to first MG 110 or second MG 120, the voltage is boosted by sub converter 202. Contrarily, when sub battery 152 is charged with the electric power generated by first MG 110 or second MG 120, the voltage is decreased by sub converter 202.

A system voltage VH between each converter and each inverter is detected by a voltage sensor 180. A detection result of voltage sensor 180 is transmitted to ECU 170.

First inverter 210 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn transistors that are connected in series. Between a collector and an emitter of each npn transistor, a diode for making a current flow from the emitter side to the collector side is connected. A connection point of each npn transistor in each arm is connected to an end part different from a neutral point 112 of each coil of first MG 110.

First inverter 210 converts a direct current supplied from master battery 150 or sub battery 152 to an alternating current and supplies it to first MG 110. First inverter 210 converts an alternating current generated by first MG 110 to a direct current.

Second inverter 220 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn transistors that are connected in series. Between a collector and an emitter of each npn transistor, a diode for making a current flow from the emitter side to the collector side is connected. A connection point of each npn transistor in each arm is connected to an end part different from a neutral point 122 of each coil of second MG 120.

Second inverter 220 converts a direct current supplied from master battery 150 or sub battery 152 to an alternating current, and supplies it to second MG 120. Second inverter 220 converts an alternating current generated by second MG 120 to a direct current.

Master converter 200, sub converter 202, first inverter 210, and second inverter 220 are controlled by ECU 170.

Master SMR 230 is provided between master battery 150 and charger 240. Master SMR 230 is a relay for switching the connected state and the disconnected state between master battery 150 and the electric system. When master SMR 230 is in an opened state, master battery 150 is disconnected from the electric system. When master SMR 230 is in a closed state, master battery 150 is connected to the electric system.

In other words, when master SMR 230 is in the opened state, master battery 150 is electrically disconnected from master converter 200, charger 240 and the like. When master SMR 230 is in the closed state, master battery 150 is electrically connected with master converter 200, charger 240 and the like.

Sub SMR 232 is provided between sub battery 152 and sub converter 202. Sub SMR 232 is a relay for switching a connected state and a disconnected state between sub battery 152 and the electric system. When sub SMR 232 is in an opened state, sub battery 152 is disconnected from the electric system. When sub SMR 232 is in a closed state, sub battery 152 is connected to the electric system.

That is, when sub SMR 232 is in the opened state, sub battery 152 is electrically disconnected from sub converter 202, charger 240 and the like. When sub SMR 232 is in the closed state, sub battery 152 is electrically connected with sub converter 202, charger 240 and the like.

States of master SMR 230 and sub SMR 232 are controlled by ECU 170. For example, when ECU 170 starts up, master SMR 230 and sub SMR 232 are closed. When ECU 170 stops, master SMR 230 and sub SMR 232 are opened.

Figure 3:
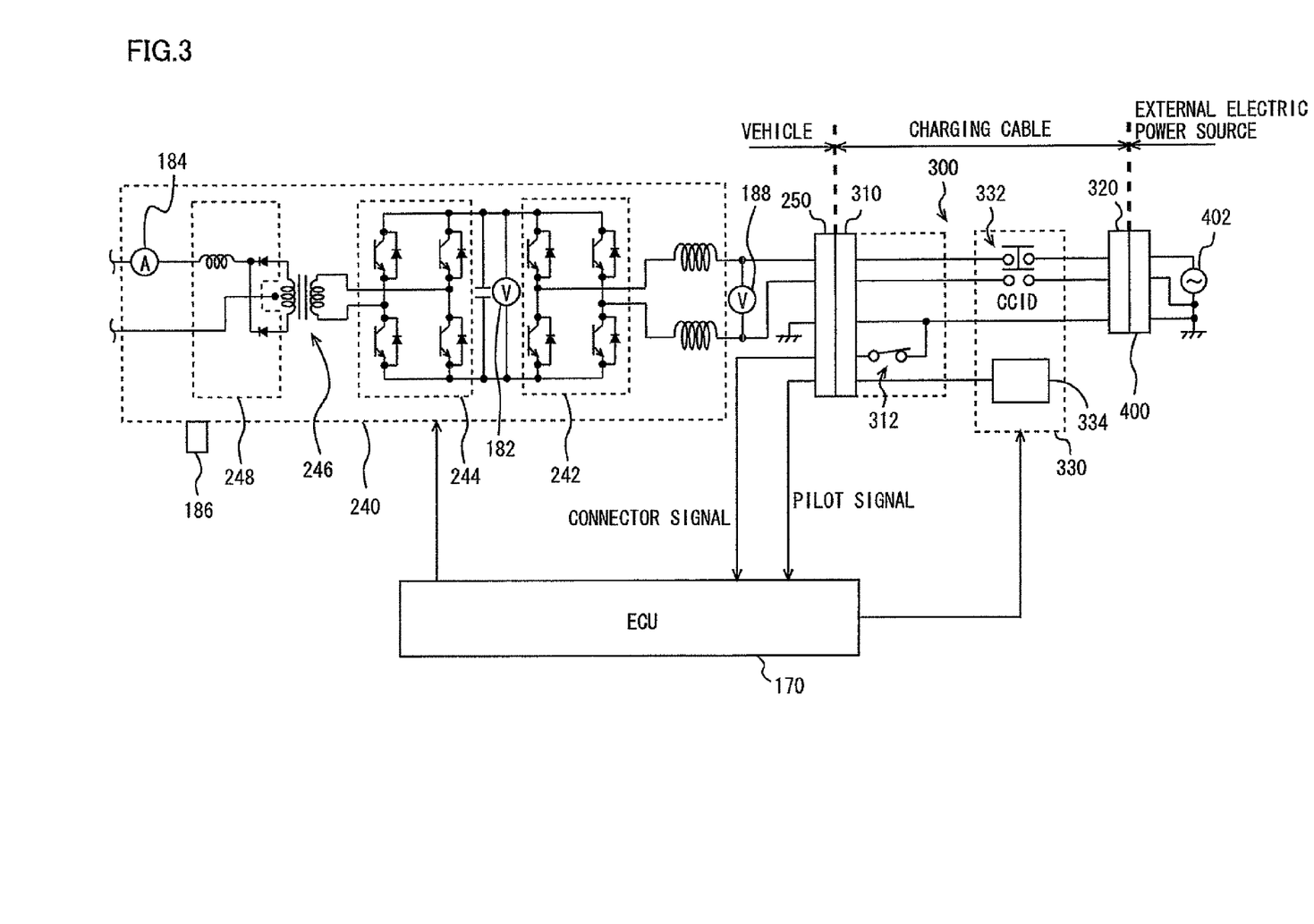
FIG. 3 is a view showing an electric system of a plug-in hybrid vehicle (Part 2).

Charger 240 is connected between master battery 150 and master converter 200. As shown in FIG. 3, charger 240 includes an AC/DC converter circuit 242, a DC/AC converter circuit 244, an insulation transformer 246, and a rectifier circuit 248.

AC/DC converter circuit 242 is implemented by a single-phase bridge circuit. AC/DC converter circuit 242 converts AC electric power to DC electric power based on a driving signal from ECU 170. AC/DC converter circuit 242 also functions as a boost chopper circuit that boosts the voltage by using a coil as a reactor.

DC/AC converter circuit 244 is implemented by a single-phase bridge circuit. DC/AC converter circuit 244 converts DC electric power to high frequency AC electric power based on a driving signal from ECU 170 and outputs it to insulation transformer 246.

Insulation transformer 246 includes a core formed of a magnetic material, and a primary coil and a secondary coil wound around the core. The primary coil and the secondary coil are electrically insulated, and are connected to DC/AC converter circuit 244 and rectifier circuit 248, respectively. Insulation transformer 246 converts the high frequency AC electric power received from DC/AC converter circuit 244 to a voltage level corresponding to a winding number ratio between the primary coil and the secondary coil, and outputs it to rectifier circuit 248. Rectifier circuit 248 rectifies AC electric power outputted from insulation transformer 246 to DC electric power.

A voltage across AC/DC converter circuit 242 and DC/AC converter circuit 244 (terminal-to-terminal voltage of smoothing capacitor) is detected by voltage sensor 182, and a signal representing the detection result is inputted to ECU 170. An output current of charger 240 is detected by a current sensor 184, and a signal representing the detection result is inputted to ECU 170. Further, temperature of charger 240 is detected by a temperature sensor 186, and a signal representing the detection result is inputted to ECU 170.

ECU 170 generates a driving signal for driving charger 240 and outputs it to charger 240 when master battery 150 or sub battery 152 is charged from a electric power source external to the vehicle.

ECU 170 has a function of detecting a fail of charger 240, as well as a function of controlling charger 240. When the voltage detected by voltage sensor 182, the current detected by current sensor 184, the temperature detected by temperature sensor 186 and so on are equal to or more than thresholds, a fail of charger 240 is detected.

Inlet 250 is provided, for example, in a lateral part of the plug-in hybrid vehicle. To inlet 250, a connector 310 of a charging cable 300 that connects the plug-in hybrid vehicle and an external electric power source 402 is connected.

Charging cable 300 that connects the plug-in hybrid vehicle and external electric power source 402 includes connector 310, a plug 320, and a CCID (Charging Circuit Interrupt Device) 330.

Connector 310 of charging cable 300 is connected to inlet 250 provided in the plug-in hybrid vehicle. Connector 310 is provided with a switch 312. When switch 312 is closed in the condition that connector 310 of charging cable 300 is connected to inlet 250 provided in the plug-in hybrid vehicle, a connector signal CNCT indicating that connector 310 of charging cable 300 is being connected with inlet 250 provided in the plug-in hybrid vehicle is inputted to ECU 170.

Switch 312 opens/closes in cooperation with a latch that latches connector 310 of charging cable 300 to inlet 250 of the hybrid vehicle. The latch oscillates as an operator presses a button provided in connector 310.

Figure 4:
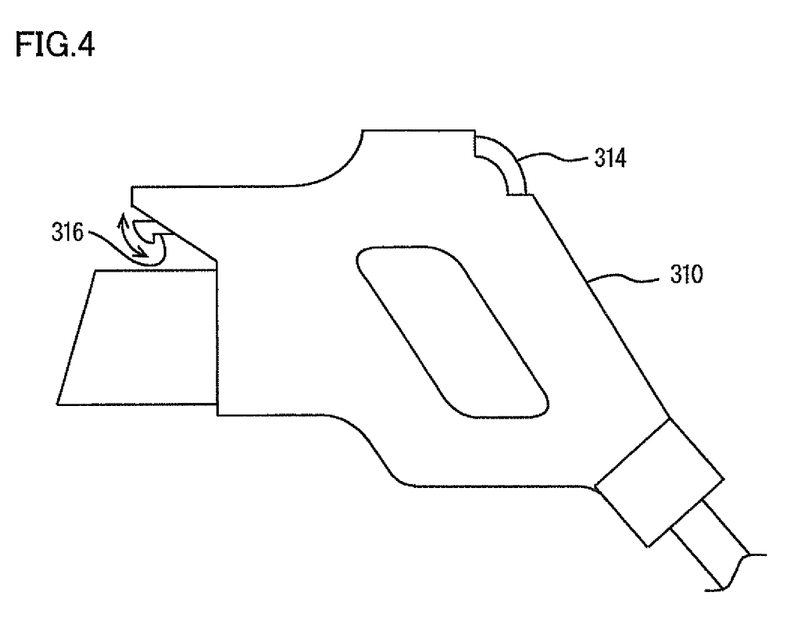
FIG. 4 is a view showing a connector of a charging cable.

For example, when an operator leaves his/her finger from a button 314 of connector 310 shown in FIG. 4 in the condition that connector 310 of charging cable 300 is connected with inlet 250 provided in the hybrid vehicle, latch 316 engages with inlet 250 provided in the hybrid vehicle, and switch 312 closes. As the operator presses button 314, latch 316 and inlet 250 are released from engagement, and switch 312 opens. The method for opening or closing switch 312 is not limited to this.

Returning to FIG. 3, plug 320 of charging cable 300 is connected to a socket 400 provided in a house. Socket 400 is supplied with AC electric power from external electric power source 402 of the plug-in hybrid vehicle.

CCID 330 has a relay 332 and a control pilot circuit 334. In the state that relay 332 is open, the route for supplying electric power from external electric power source 402 of the plug-in hybrid vehicle to the plug-in hybrid vehicle is blocked. In the state that relay 332 is closed, electric power supply from external electric power source 402 of the plug-in hybrid vehicle to the plug-in hybrid vehicle is allowed. The state of relay 332 is controlled by ECU 170 in the condition that connector 310 of charging cable 300 is connected to inlet 250 of the plug-in hybrid vehicle.

Control pilot circuit 334 sends a pilot signal (square wave signal) CPLT to a control pilot line in the condition that plug 320 of charging cable 300 is connected to socket 400, namely to external electric power source 402, and connector 310 is connected to inlet 250 provided in the plug-in hybrid vehicle. The pilot signal is oscillated by an oscillator provided in control pilot circuit 334.

Control pilot circuit 334 is able to output a constant pilot signal CPLT when plug 320 of charging cable 300 is connected to socket 400 even if connector 310 is removed from inlet 250 provided in the plug-in hybrid vehicle. ECU 170 is unable to detect a pilot signal CPLT outputted in the condition that connector 310 is removed from inlet 250 provided in the plug-in hybrid vehicle.

When plug 320 of charging cable 300 is connected to socket 400, and connector 310 is connected to inlet 250 of the plug-in hybrid vehicle, control pilot circuit 334 oscillates a pilot signal CPLT having a predetermined pulse width (duty cycle).

The plug-in hybrid vehicle is notified of a current capacity that can be supplied by a pulse width of pilot signal CPLT. For example, the plug-in hybrid vehicle is notified of a current capacity of charging cable 300. The pulse width of pilot signal CPLT is constant irrespective of the voltage and the current of external electric power source 402.

On the other hand, the pulse width of pilot signal CPLT can vary with the kind of the charging cable that is used. To be more specific, the pulse width of pilot signal CPLT can be determined for each kind of charging cable.

In the present embodiment, in the condition that the plug-in hybrid vehicle and external electric power source 402 are connected by charging cable 300, master battery 150 or sub battery 152 is charged with the electric power supplied from external electric power source 402. At the time of charging master battery 150 or sub battery 152, relay 332 in master SMR 230, sub SMR 232, and CCID 330 is closed.

An AC voltage VAC of external electric power source 402 is detected by a voltage sensor 188 provided inside the plug-in hybrid vehicle. The detected voltage VAC is transmitted to ECU 170.

Figure 5:
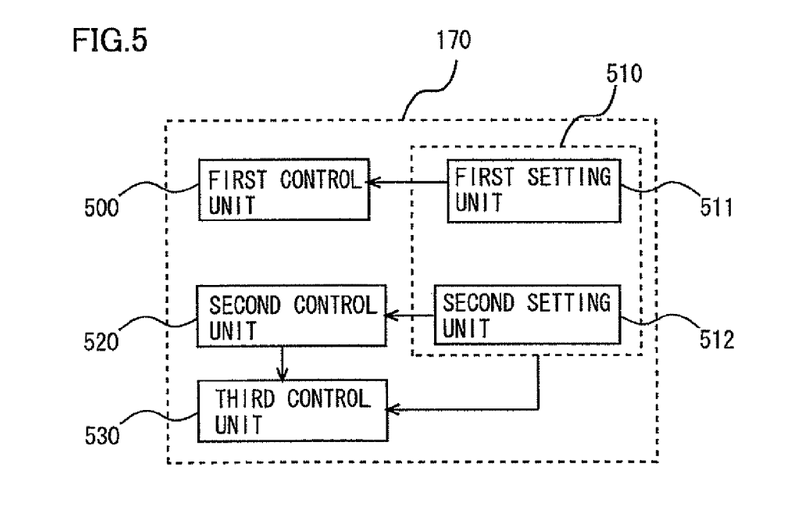
FIG. 5 is a functional block diagram of an ECU.

Referring to FIG. 5, a function of ECU 170 will be further described. The function described below may be implemented by software, or by hardware.

ECU 170 has a first control unit 500, a setting unit 510, a second control unit 520, and a third control unit 530.

Figure 6:
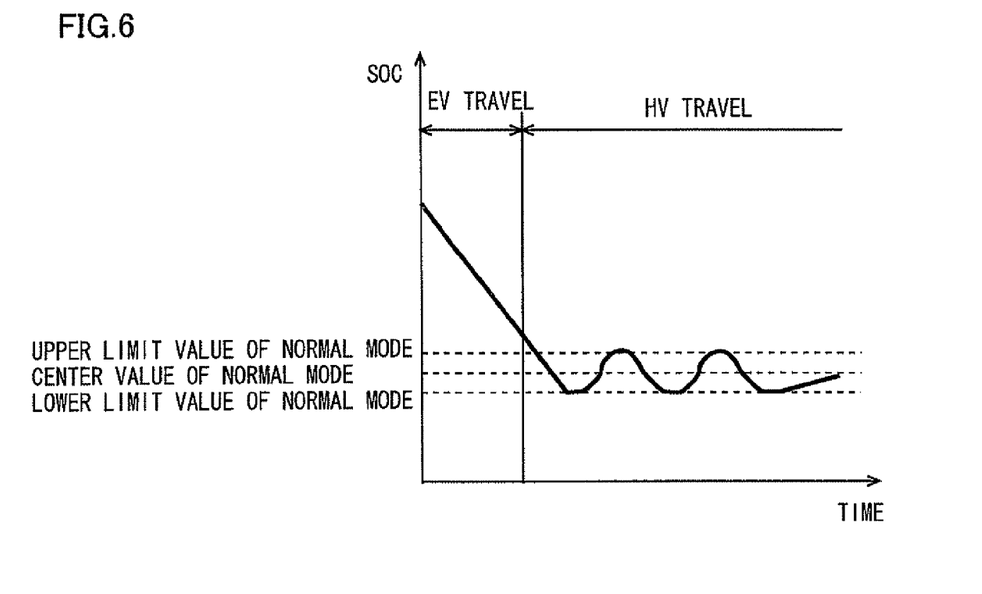
FIG. 6 is a view showing an upper limit value and a lower limit value of SOC in a normal mode.

First control unit 500 controls the SOCs of master battery 150 and sub battery 152 so that the SOC varies within the range from a predetermined upper limit value and lower limit value in the HV travel mode as shown in FIG. 6. The SOCs of master battery 150 and sub battery 152 are indirectly controlled by controlling engine 100, first MG 110, and second MG 120. FIG. 6 shows an upper limit value and a lower limit value of SOC in a normal mode.

The control may be conducted such that the SOCs of master battery 150 and sub battery 152 are equal to predetermined target values.

Returning to FIG. 5, setting unit 510 includes a first setting unit 511 and a second setting unit 512. First setting unit 511 sets an upper limit value and a lower limit value of SOC of master battery 150 for an EV priority mode when the condition that execution of charging with the electric power supplied from the source external to the plug-in hybrid vehicle is predicted is satisfied. Here, the EV priority mode means a mode capable of executing travel in the EV travel mode preferentially.

Figure 7:
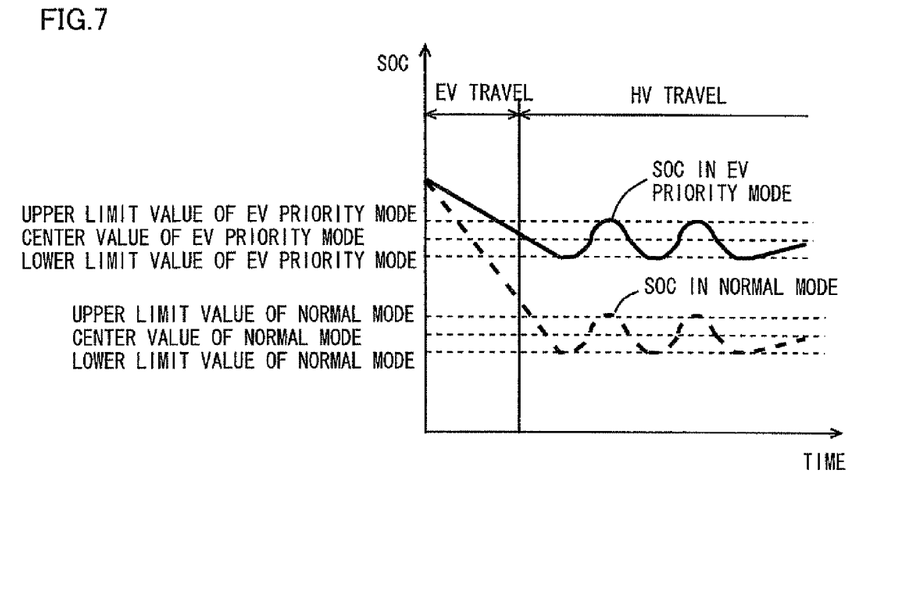
FIG. 7 is a view showing an upper limit value and a lower limit value of SOC of a master battery in an EV priority mode.

In the EV priority mode, the upper limit value and the lower limit value of the SOC of master battery 150 are set to be higher than those in the normal mode as shown in FIG. 7.

That is, when the condition that execution of charging with the electric power supplied from the source external to the plug-in hybrid vehicle is predicted is satisfied, the upper limit value and the lower limit value of the SOC of master battery 150 are set so that the SOC of master battery 150 is higher than the SOC of the case where the condition is not satisfied.

As a result, as shown by the continuous line in FIG. 7, it is possible to make the SOC of master battery 150 higher in the EV priority mode than in the normal mode.

The condition that execution of charging with the electric power supplied from the source external to the plug-in hybrid vehicle is predicted is, for example, a condition that time at which the plug-in hybrid vehicle is predicted to arrive at the location (for example, home) where it is defined that charging with the electric power supplied from the source external to the plug-in hybrid vehicle is possible is included in a time zone where the electric power rate is set to be lower than that in other time zones. In other words, when it is predicted that charging can be executed in the time zone where electric power rate is lower than that in the daytime, the setting is made so that the upper limit value and the lower limit value of the SOC of master battery 150 are high. Besides, other condition than the aforementioned condition such as a condition that the expected arrival time is in the night may be employed.

Either one of the upper limit value and the lower limit value may be set to be high. Also the setting may be made so that the upper limit value and the lower limit value are identical between the case where the condition is satisfied and the case where the condition is not satisfied. Further, the setting may be made so that the target value of the SOC of master battery 150 is high when the condition is satisfied, or the setting may be made so that the target values are identical between the case where the condition is satisfied and the case where the condition is not satisfied.

Second setting unit 512 sets a lower limit value of the SOC of sub battery 152 for EV priority mode so that the SOC of sub battery 152 is low when the condition that execution of charging with the electric power supplied from the source external to the plug-in hybrid vehicle is predicted is satisfied.

Figure 8:
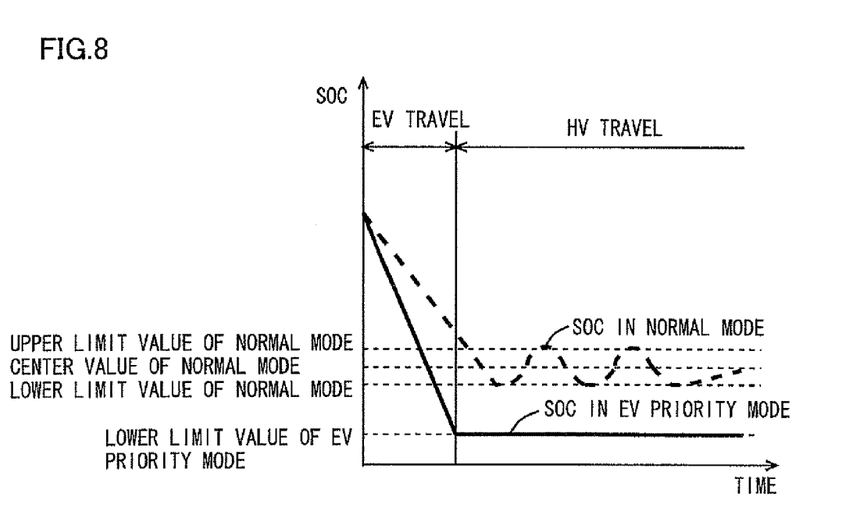
FIG. 8 is a view showing a lower limit value of SOC of a sub battery in an EV priority mode.

In the EV priority mode, the setting is made so that the lower limit value of the SOC of sub battery 152 is lower than that in the normal mode as shown in FIG. 8. That is, when the condition that execution of charging with the electric power supplied from the source external to the plug-in hybrid vehicle is predicted is satisfied, the lower limit value of the SOC of sub battery 152 is made low so that the SOC of sub battery 152 is lower than the SOC of the case where the condition is not satisfied. As a result, it is possible to make the SOC of sub battery 152 in the EV priority mode lower than the SOC in the normal mode.

Also the setting may be made so that only the upper limit value is low, or both the upper limit value and the lower limit value are low. Also the setting may be made so that the target value of the SOC of master battery 150 is low when the condition is satisfied.

Since the capacity of master battery 150 and the capacity of sub battery 152 are equivalent, the SOC of sub battery 152 becomes lower than the SOC of master battery 150 by causing the SOC of master battery 150 to be higher than the SOC of the case where the condition is not satisfied and the SOC of sub battery 152 to be lower than the SOC of the case where the condition is not satisfied.

Figure 9:
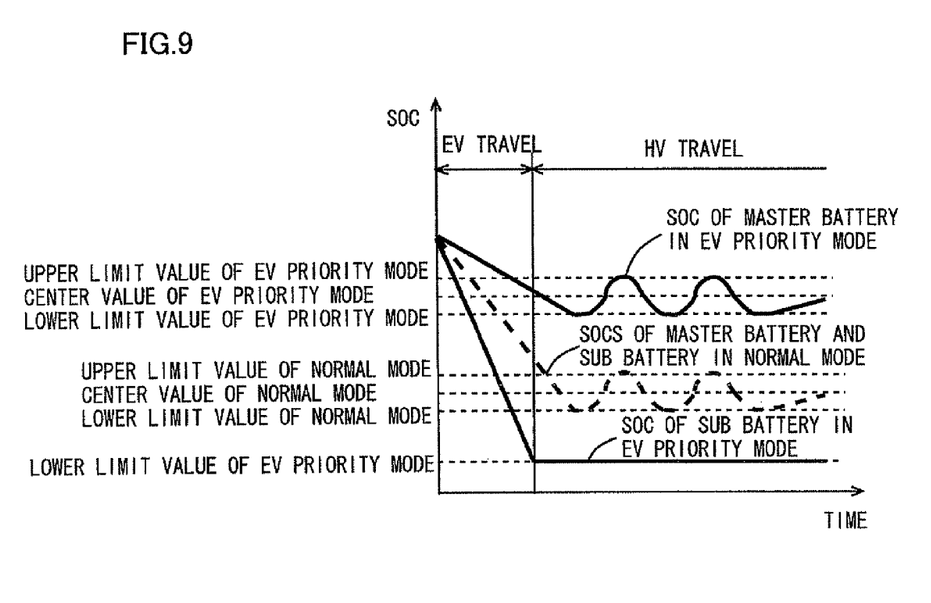
FIG. 9 is a view showing the SOC of the master battery and the SOC of the sub battery in an EV priority mode.

That is, when the condition that execution of charging with the electric power supplied from the source external to the plug-in hybrid vehicle is predicted is satisfied, setting unit 510 sets the upper limit values and the lower limit values of the SOC of master battery 150 and the SOC of sub battery 152 so that the SOC of sub battery 152 is lower than the SOC of master battery 150 as shown in FIG. 9, by causing the SOC of master battery 150 to be higher than the SOC of the case where the condition is not satisfied and the SOC of sub battery 152 to be lower than the SOC of the case where the condition is not satisfied.

The target values of the SOC of master battery 150 and the SOC of sub battery 152 may be set so that the SOC of sub battery 152 is lower than the SOC of master battery 150.

Second control unit 520 controls the SOC of sub battery 152 in the HV travel mode to decrease to the lower limit value as shown in FIG. 8 and FIG. 9 when the condition that execution of charging with the electric power supplied from the source external to the plug-in hybrid vehicle is predicted is satisfied.

That is, by driving second MG 120 using the electric power stored in sub battery 152, the plug-in hybrid vehicle travels preferentially in the EV travel mode until the SOC of sub battery 152 decreases to the lower limit value as shown in FIG. 8 and FIG. 9.

Third control unit 530 controls the vehicle to travel in the HV travel mode after the SOC of sub battery 152 becomes lower than the SOC of master battery 150, namely, after the SOC of sub battery 152 decreases to the lower limit value, as shown in FIG. 8 and FIG. 9.

Figure 10:
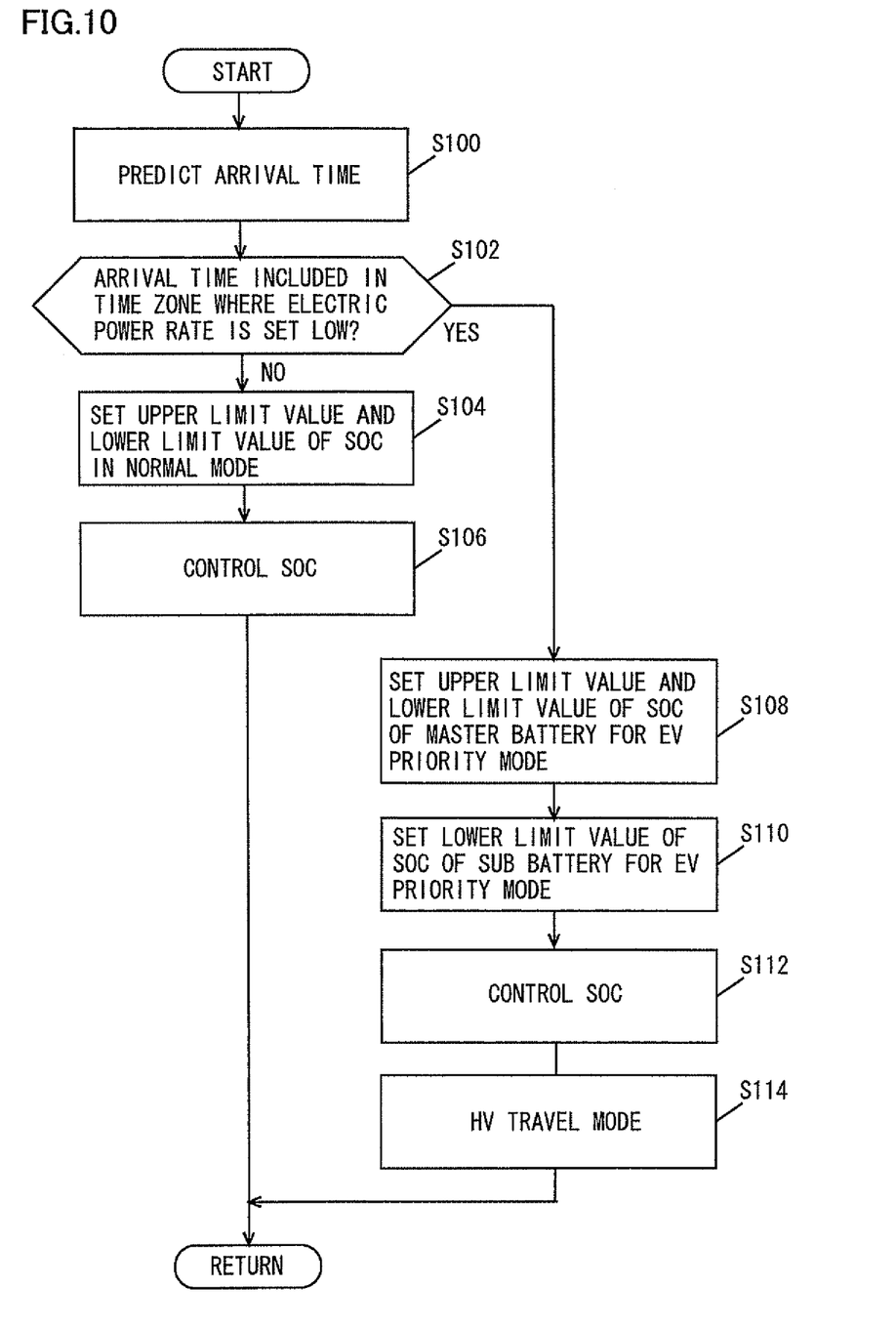
FIG. 10 is a flowchart showing a control structure of a program executed by an ECU.

Referring to FIG. 10, a control structure of a program executed by ECU 170 will be described.

In step (hereinafter, step is abbreviated as S) 100, ECU 170 predicts the time at which the plug-in hybrid vehicle arrives at the location (for example, home) where it is defined that charging with the electric power supplied from the source external to the plug-in hybrid vehicle is possible.

In S102, ECU 170 determines whether time at which the plug-in hybrid vehicle arrives at the location where it is defined that charging with the electric power supplied from the source external to the plug-in hybrid vehicle is possible is included in a time zone where electric power rate is set lower than that in other time zones.

When the time at which the plug-in hybrid vehicle arrives at the location where it is defined that charging with the electric power supplied from the source external to the plug-in hybrid vehicle is possible is included in the time zone where electric power rate is set lower than that in other time zones (YES in S102), the process proceeds to S108. When it is not so (NO in S102), the process proceeds to S104.

In S104, ECU 170 sets upper limit values and lower limit values of the SOC of master battery 150 and sub battery 152 in the normal mode.

In S106, ECU 170 controls the SOCs of master battery 150 and sub battery 152 so that the SOCs vary within the range between the defined upper limit value and lower limit value.

In S108, ECU 170 sets the upper limit value and the lower limit value of the SOC of master battery 150 for the EV priority mode so that they are higher than those in the normal mode.

In S110, ECU 170 sets the lower limit value of the SOC of sub battery 152 for the EV priority mode so that it is lower than that in the normal mode.

In S112, ECU 170 controls the SOC of master battery 150 so that the SOC varies within the range between the defined upper limit value and lower limit value, and controls the SOC of sub battery 152 so that it decreases to the lower limit value.

In S114, ECU 170 controls the vehicle to travel in the HV travel mode. An operation of the control device according to the present embodiment based on the structure and flow chart as described above will be described.

During travel of the plug-in hybrid vehicle, the time at which the plug-in hybrid vehicle arrives at the location (for example, home) where it is defined that charging with the electric power supplied from the source external to the plug-in hybrid vehicle is possible is predicted by using the navigation device (S100).

When the time at which the plug-in hybrid vehicle arrives at the location where it is defined that charging with the electric power supplied from the source external to the plug-in hybrid vehicle is possible is not included in the time zone where the electric power rate is set to be lower than that in other time zones (NO in S102), the upper limit values and the lower limit values of the SOCs of master battery 150 and sub battery 152 in the normal mode are set (S104).

The SOCs master battery 150 and sub battery 152 are controlled so that the SOCs vary within the range between the defined upper limit value and lower limit value (S106).

On the other hand, when the time at which the plug-in hybrid vehicle arrives at the location where it is defined that charging with the electric power supplied from the source external to the plug-in hybrid vehicle is possible is included in the time zone where the electric power rate is set to be lower than that in other time zones (YES in S102), the upper limit value and the lower limit value of the SOC of master battery 150 are set to be higher than those in the normal mode (S108). Also, the lower limit value of the SOC of sub battery 152 is set to be lower than that in the normal mode (S110).

Further, the SOC of master battery 150 is controlled so that the SOC varies within the range between the defined upper limit value and lower limit value and the SOC of sub battery 152 is controlled so that it decreases to the lower limit value (S112). Then the vehicle is controlled so that it travels in the HV travel mode (S114).

As a result, it is possible to make the SOC of sub battery 152 lower than the SOC of master battery 150, and to store the electric power required for traveling in the HV travel mode in master battery 150 during traveling of the plug-in hybrid vehicle. Therefore, when charging is executed with electric power supplied from the external electric power source of the vehicle, it is possible to increase the charging amount of sub battery 152 using low-cost electric power in the middle of the night. As a result, it is possible to reduce the cost required for charging. On the other hand, even when charging is not executed for some reason, second MG 120 can be driven by using the electric power stored in master battery 150. Therefore, even when charging is not executed, it is possible to ensure the motive power performance.

It should be noted that the embodiments disclosed herein are given in every respect for exemplification rather than limitation. The scope of the present invention is defined by claims rather than by the embodiments described above, and equivalent meanings to the claims and every modification within the scope are intended to be implied.

DESCRIPTION OF THE REFERENCE SIGNS 100 engine, 110 first MG, 120 second MG, 130 power split device, 140 reduction gear, 150 master battery, 152 sub battery, 160 front wheel, 170 ECU, 172 navigation device, 200 master converter, 202 sub converter, 210 first inverter, 220 second inverter, 230 master SMR, 232 sub SMR, 240 charger, 242 AC/DC converter circuit, 244 DC/AC converter circuit, 246 insulation transformer, 248 rectifier circuit, 250 inlet, 300 charging cable, 310 connector, 312 switch, 314 button, 316 latch, 320 plug, 332 relay, 334 control pilot circuit, 400 socket, 402 electric power supply, 500 first control unit, 511 first setting unit, 512 second setting unit, 520 second control unit, 530 third control unit.

The invention claimed is:

1. A vehicle comprising:
an internal combustion engine as a driving source;
a rotating electric machine as a driving source;
a generator for generating electric power by a driving force of said internal combustion engine;
a first battery for storing electric power supplied from a source external to a vehicle and electric power generated by said generator and supplying the stored electric power to said rotating electric machine;
a second battery connected in parallel with said first battery, for storing electric power supplied from the source external to said vehicle and electric power generated by said generator and supplying the stored electric power to said rotating electric machine; and
a control unit, wherein
said control unit
controls a state of charge of each of said batteries according to at least either one of a target range and a target value of the state of charge of each of said batteries,
sets at least either one of the target range and the target value of the state of charge of each of said batteries so that the state of charge of said second battery is lower than the state of charge of said first battery by causing, when a condition that execution of charging with electric power supplied from the source external to said vehicle is predicted is satisfied, the state of charge of said first battery to be equal to or more than the state of charge of said first battery of the case where said condition is not satisfied and the state of charge of said second battery to be lower than the state of charge of said second battery of the case where said condition is not satisfied, and
controls said internal combustion engine and said rotating electric machine so that said vehicle travels by a driving force of at least either one of said internal combustion engine and said rotating electric machine after the state of charge of said second battery becomes lower than the state of charge of said first battery.

2. The vehicle according to claim 1, wherein
the condition that execution of charging with electric power supplied from the source external to said vehicle is predicted is a condition that time at which said vehicle is predicted to arrive at a location where it is defined that charging with electric power supplied from the source external to said vehicle is possible is included in a time zone where electric power rate is set to be lower than that in other time zones.

3. The vehicle according to claim 1, wherein
said control unit controls the state of charge of said second battery to decrease to a lower limit value.

4. A vehicle comprising:
an internal combustion engine as a driving source;
a rotating electric machine as a driving source;
a generator for generating electric power by a driving force of said internal combustion engine;
a first battery for storing electric power supplied from a source external to a vehicle and electric power generated by said generator and supplying the stored electric power to said rotating electric machine;
a second battery connected in parallel with said first battery, for storing electric power supplied from the source external to said vehicle and electric power generated by said generator and supplying the stored electric power to said rotating electric machine; and
a control unit, wherein
said control unit
controls a state of charge of each of said batteries according to at least either one of a target range and a target value of the state of charge of each of said batteries,
sets at least either one of the target range and the target value of the state of charge of each of said batteries so that the state of charge of said second battery is lower than the state of charge of said first battery, and
controls said internal combustion engine and said rotating electric machine so that said vehicle travels by a driving force of at least either one of said internal combustion engine and said rotating electric machine after the state of charge of said second battery becomes lower than the state of charge of said first battery, and
a capacity of said first battery and a capacity of said second battery are equivalent.

5. A control method for a vehicle equipped with an internal combustion engine as a driving source; a rotating electric machine as a driving source; a generator for generating electric power by a driving force of said internal combustion engine; a first battery for storing electric power supplied from a source external to a vehicle and electric power generated by said generator and supplying the stored electric power to said rotating electric machine; and a second battery connected in parallel with said first battery, for storing electric power supplied from the source external to said vehicle and electric power generated by said generator and supplying the stored electric power to said rotating electric machine, the method comprising the steps of:
controlling a state of charge of each of said batteries according to at least either one of a target range and a target value of the state of charge of each of said batteries;
setting at least either one of the target range and the target value of a state of charge of each of said batteries so that the state of charge of said second battery is lower than the state of charge of said first battery, by causing, when a condition that execution of charging with electric power supplied from the source external to said vehicle is predicted is satisfied, the state of charge of said first battery to be equal to or more than the state of charge of said first battery of the case where said condition is not satisfied and the state of charge of said second battery to be lower than the state of charge of said second battery of the case where said condition is not satisfied; and controlling said internal combustion engine and said rotating electric machine so that said vehicle travels by a driving force of at least either one of said internal combustion engine and said rotating electric machine after the state of charge of said second battery becomes lower than the state of charge of said first battery.

6. The control method for a vehicle according to claim 5, wherein the condition that execution of charging with electric power supplied from the source external to said vehicle is predicted is a condition that time at which said vehicle is predicted to arrive at a location where it is defined that charging with electric power supplied from the source external to said vehicle is possible is included in a time zone where electric power rate is set to be lower than that in other time zones.

7. The control method for a vehicle according to claim 5, further comprising the step of controlling the state of charge of said second battery to decrease to a lower limit value.

8. A control method for a vehicle equipped with an internal combustion engine as a driving source; a rotating electric machine as a driving source; a generator for generating electric power by a driving force of said internal combustion engine; a first battery for storing electric power supplied from a source external to a vehicle and electric power generated by said generator and supplying the stored electric power to said rotating electric machine; and a second battery connected in parallel with said first battery, for storing electric power supplied from the source external to said vehicle and electric power generated by said generator and supplying the stored electric power to said rotating electric machine, the method comprising the steps of:

controlling a state of charge of each of said batteries according to at least either one of a target range and a target value of the state of charge of each of said batteries;

setting at least either one of the target range and the target value of the state of charge of each of said batteries so that the state of charge of said second battery is lower than the state of charge of said first battery; and controlling said internal combustion engine and said rotating electric machine so that said vehicle travels by a driving force of at least either one of said internal combustion engine and said rotating electric machine after the state of charge of said second battery becomes lower than the state of charge of said first battery, wherein a capacity of said first battery and a capacity of said second battery are equivalent.

9. A control device for a vehicle equipped with an internal combustion engine as a driving source; a rotating electric machine as a driving source; a generator for generating electric power by a driving force of said internal combustion engine; a first battery for storing electric power supplied from a source external to a vehicle and electric power generated by said generator and supplying the stored electric power to said rotating electric machine; and a second battery connected in parallel with said first battery, for storing electric power supplied from the source external to said vehicle and electric power generated by said generator and supplying the stored electric power to said rotating electric machine, the control device for a vehicle comprising:

means for controlling a state of charge of each of said batteries according to at least either one of a target range and a target value of the state of charge of each of said batteries;

means for setting at least either one of the target range and the target value of the state of charge of each of said batteries so that the state of charge of said second battery is lower than a state of charge of said first battery, by causing, when a condition that execution of charging with electric power supplied from the source external to said vehicle is predicted is satisfied, the state of charge of said first battery to be equal to or more than the state of charge of said first battery of the case where said condition is not satisfied and the state of charge of said second battery to be lower than the state of charge of said second battery of the case where said condition is not satisfied; and means for controlling said internal combustion engine and said rotating electric machine so that said vehicle travels by a driving force of at least either one of said internal combustion engine and said rotating electric machine after the state of charge of said second battery becomes lower than the state of charge of said first battery.

* * * * *